United States Patent [19]
Karasawa et al.

[11] Patent Number: 5,841,506
[45] Date of Patent: Nov. 24, 1998

[54] SUPERIMPOSABLE EYEGLASSES

[75] Inventors: Naoki Karasawa; Toshio Totsuka; Takuro Tsukatani, all of Ann Arbor, Mich.

[73] Assignee: Ozmix, Inc., Ann Arbor, Mich.

[21] Appl. No.: 885,582

[22] Filed: Jun. 30, 1997

Related U.S. Application Data

[63] Continuation-in-part of Ser. No. 646,461, May 8, 1996, abandoned.

[51] Int. Cl.$^6$ .............................. G01C 9/00; G01C 7/12
[52] U.S. Cl. .................................. 351/47; 351/49; 351/57
[58] Field of Search ................................ 351/47, 48, 49, 351/57, 58, 41

[56]  References Cited
U.S. PATENT DOCUMENTS 4,386,832  6/1983  Nannini ...................................... 351/49

*Primary Examiner*—Hung X. Dang
*Attorney, Agent, or Firm*—Young & Basile, P.C.

[57]  ABSTRACT

A lens assembly is disclosed comprising at least first and second removably superimposed eyewear elements each comprising a frame member including framing means for at least one lens. Each frame member has a first longitudinal curvature in an unassembled condition of the lens assembly, and at least the at least second eyewear element further has a flexible intermediate portion providing for longitudinal flexibility of the at least second eyewear element along a transverse medial axis thereof such that the at least second eyewear element is deformable to define a second longitudinal curvature complimentary with the first longitudinal curvature of the at least first eyewear element when the at least first and second eyewear elements are removably axially superimposed in longitudinal alignment.

19 Claims, 12 Drawing Sheets

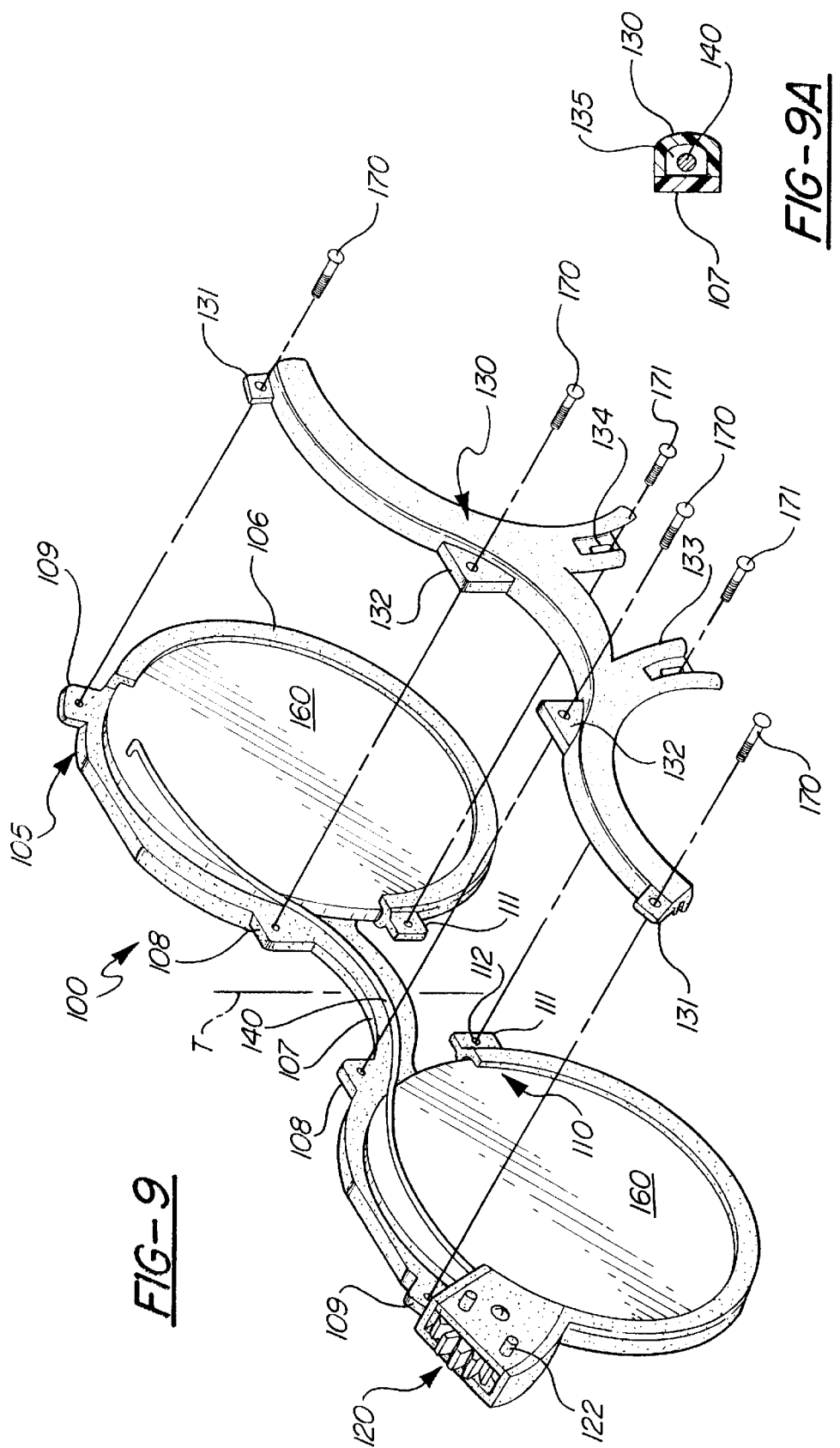

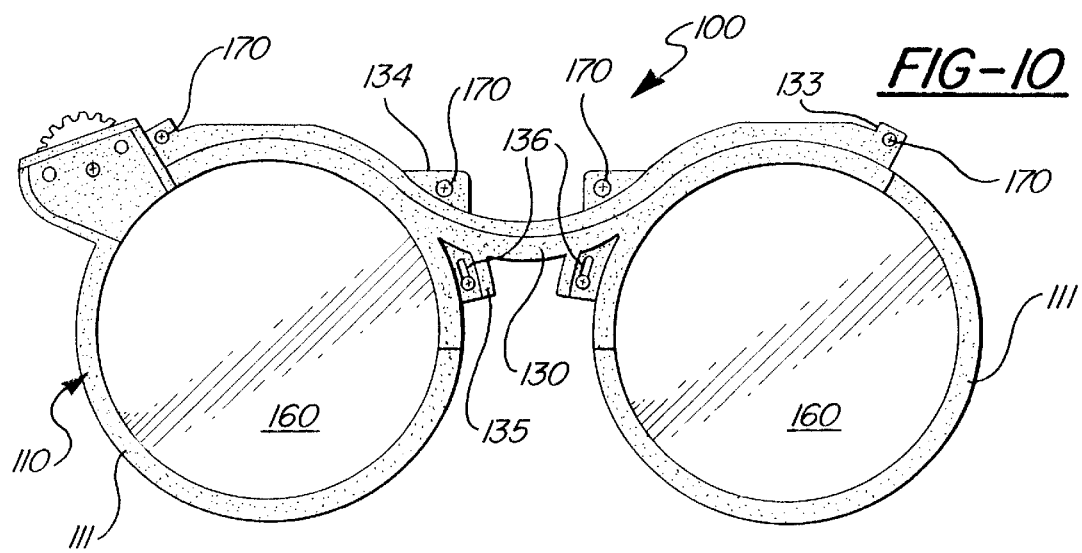
FIG-10
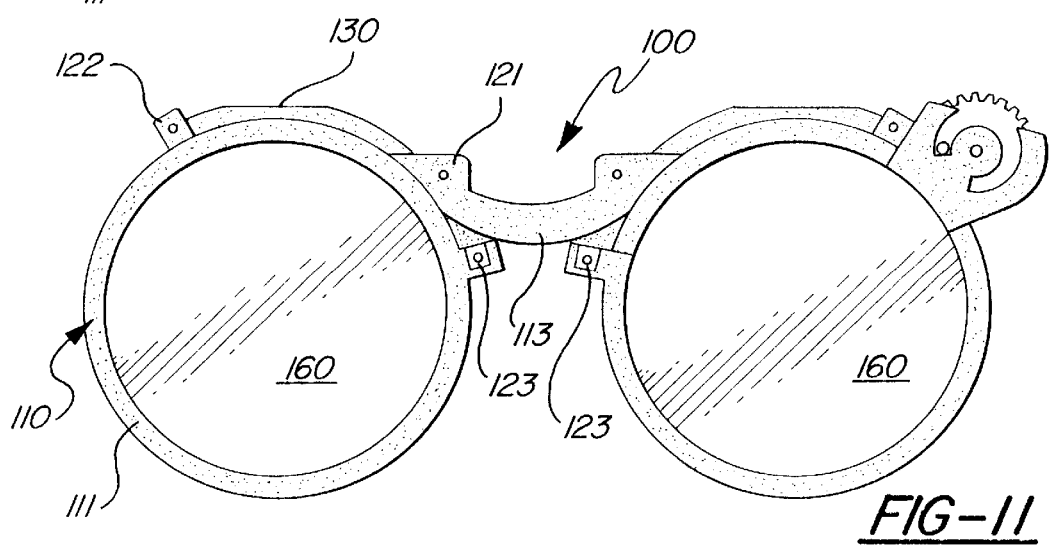
FIG-11
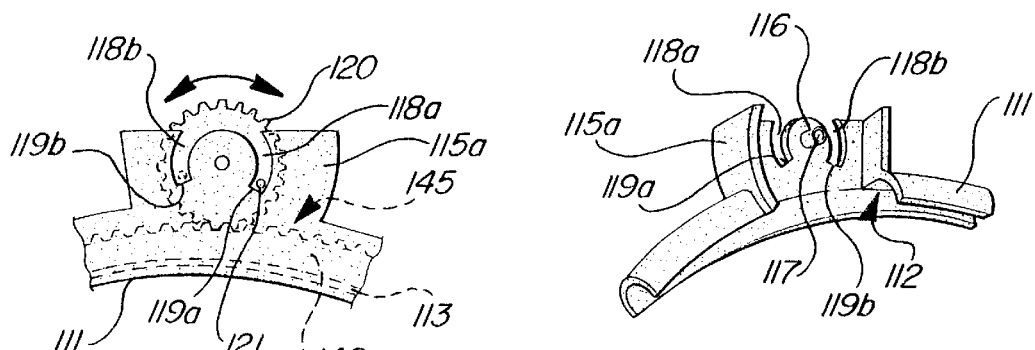
FIG-13
FIG-14

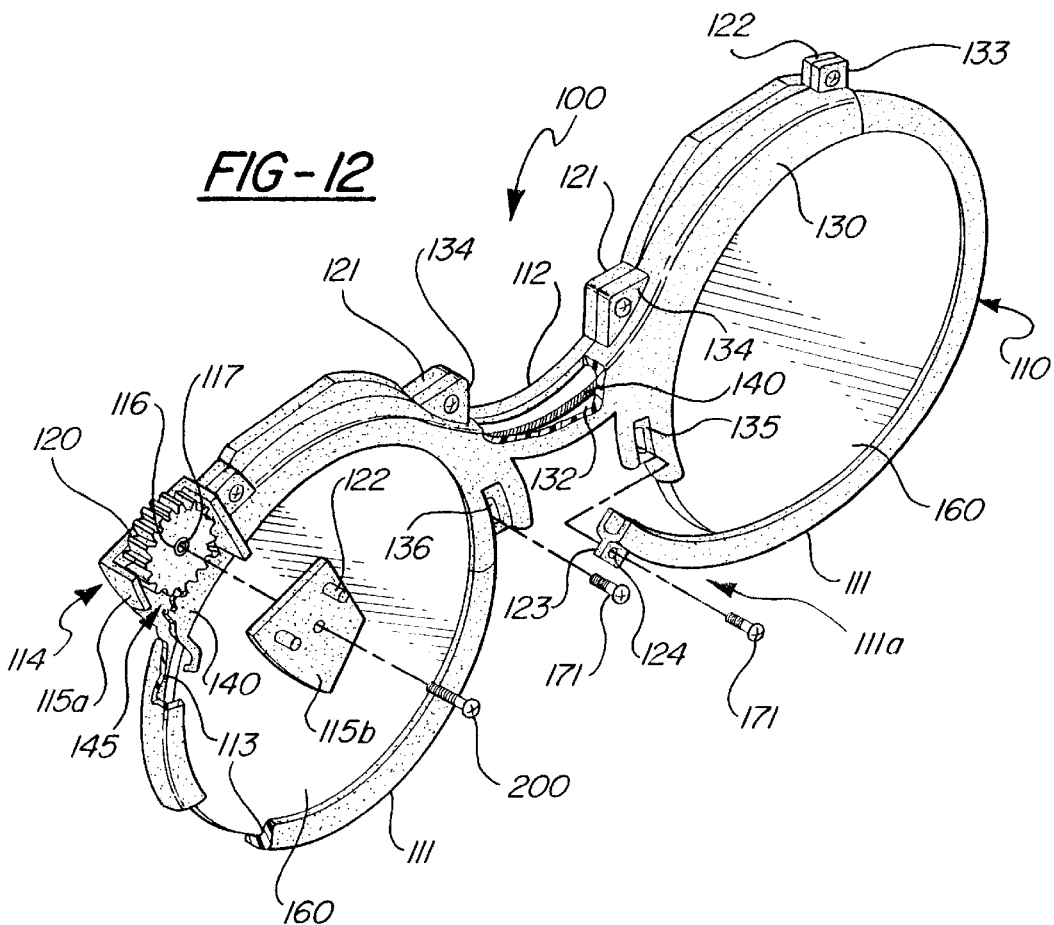
FIG-12
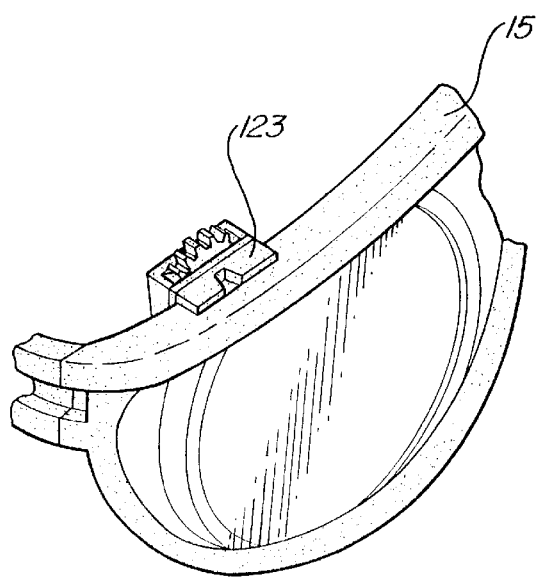
FIG-15
FIG-15A

SUPERIMPOSABLE EYEGLASSES

This application is a continuation-in-part and claims the benefit of prior U.S. patent application Ser. No. 08/646,461, filed May 8, 1996 now abandoned.

FIELD OF THE INVENTION

The present invention relates generally to a lens assembly such as eyeglasses or sunglasses and, more particularly, to a lens assembly having first and second cooperatively engageable, removably superimposed eyewear elements wherein at least the second eyewear element includes a flexible intermediate portion permitting the first and second eyewear elements to be removably superimposed in complimentary aligned fashion irrespective of the degree of curvature of the first eyewear element. In a lens assembly including framing means for at least one lens, the present invention further relates to improved means for selectively adjusting the internal dimensions of the framing means in order to accommodate lenses of varying diameters.

BACKGROUND OF THE INVENTION

With respect to conventional eyeglasses, it is known that two separate, rigid eyewear frames may be fixedly superimposed; for example, to incorporate prescription eyeglasses into sunglasses. However, it is heretofore unknown to provide for separate frame members which may be selectively interchanged with frame members of varying curvatures.

SUMMARY OF THE PRESENT INVENTION

It is therefore an object of the present invention to provide for a lens assembly comprising at least first and second removably superimposed eyewear elements having, for example, the form of conventional eyeglasses or sunglasses, wherein the second eyewear element includes a flexible intermediate portion permitting variations in the curvature of the second eyewear element such that the first and second eyewear elements may be removably superimposed in complimentary aligned fashion, irrespective of the degree of curvature of the first eyewear element. Accordingly, the second eyewear element may be interchangeably removably superimposed with any number of first eyewear elements, each having a different curvature. Per one feature of the present invention, the first and second eyewear elements are removably engaged via cooperative engagement means. In one embodiment, these cooperative engagement means include a flexible clamp provided on the first eyewear element, the clamp defining a channel therein for removably receiving a portion of the second eyewear element. The clamp has at least one flexibly resilient arm positionable over a portion of the second eyewear element so as to removably capture the same within the channel. According to a second embodiment, the cooperative engagement means comprise an opening for removably receiving therein a portion of the second eyewear element. The opening is defined in part by restraining means preventing axial separation of the first and second eyewear elements. According to a third embodiment, the cooperative engagement means comprise a closure selectively positionable between an open configuration, wherein the first and second eyewear elements are axially separable, and a closed configuration, wherein said closure is brought into restraining engagement with the second eyewear element, thereby preventing axial separation of the first and second eyewear elements.

According to one embodiment of the present invention, the at least first and second eyewear elements each include a frame member having framing means for a pair of lenses and the flexible intermediate portion of the second eyewear element comprises at least a first flexible bridge connecting the framing means thereof. In the illustrated form of this embodiment, the lens assembly of the present invention comprises variable density, light-polarizing sunglasses. Accordingly, the second eyewear element includes at least two axially rotatable, light-polarizing lenses, as well as drive means for incrementally rotating the lenses relative to the light-polarizing lenses of the first eyewear element in order to affect light transmission through the lens assembly. The drive means comprise an externally actuated drive element including a drive gear rotatably fixed to the frame member of the second eyewear element, a driven gear in mechanical communication with the drive gear and affecting rotation of at least one of the rotatable lenses, and belt means. The belt means extend between and connect the rotatable lenses to effect simultaneous rotation of the rotatable lenses. According to one feature of this embodiment, the driven gear is formed integral with the belt means. According to another feature, rotation of the drive gear is limited by arresting means such that the axially rotatable lenses of the second eyewear element are positionable between rotational orientations corresponding to a maximum and a minimum amount of light transmission through the lens assembly. The arresting means comprise a gear stopper provided on the drive gear, and first and second stop surfaces provided on the frame member of the second eyewear element and engageable with the gear stopper to limit the rotational path of the drive gear.

It is a further object of the present invention to provide for an eyewear element having framing means for at least one lens, the internal dimensions of which may be quickly and easily varied to accommodate lenses of a variety of diameters. The present invention provides at least one frame member having means for radially adjusting the internal dimensions of the framing means.

The framing means are split to define a movably free end of the framing means including a first flange portion adjustably positionable in overlapping relationship with a fixed second flange portion of the frame member, the first and second flange portions being adjustably fixed with respect to each other via fastening means received through axially alignable openings in each of the first and second flange portions, the axes of which openings are oriented approximately parallel with the axis of the frame member. According to this feature, the opening of at least one of the flange portions comprises a slot extending coplanar with the framing means so as to define a plurality of internal dimensions of the framing means.

BRIEF DESCRIPTION OF THE DRAWINGS

FIG. 9 is a partially exploded perspective view of the second eyewear element of the present invention;

FIG. 9A is a medial cross-section of the assembled second eyewear element of the present invention;

FIG. 10 is a frontal view of the second eyewear element of the present invention;

FIG. 11 is a rear elevation of the second eyewear element of the present invention;

FIG. 12 is a perspective view of the second eyewear element of the present invention shown in a partially disassembled condition and with portions of the exterior thereof cut away;

FIGS. 13 and 14 are detailed views of a portion of the second eyewear element showing the gear stopper mechanism of the present invention;

FIG. 15 depicts one embodiment of the stabilizing means of the present invention;

FIG. 15A is a partial perspective view of the assembled lens assembly of the present invention, depicting in detail the stabilizing means of FIG. 15;

DETAILED DESCRIPTION OF THE ILLUSTRATED EMBODIMENT

Figure 1:
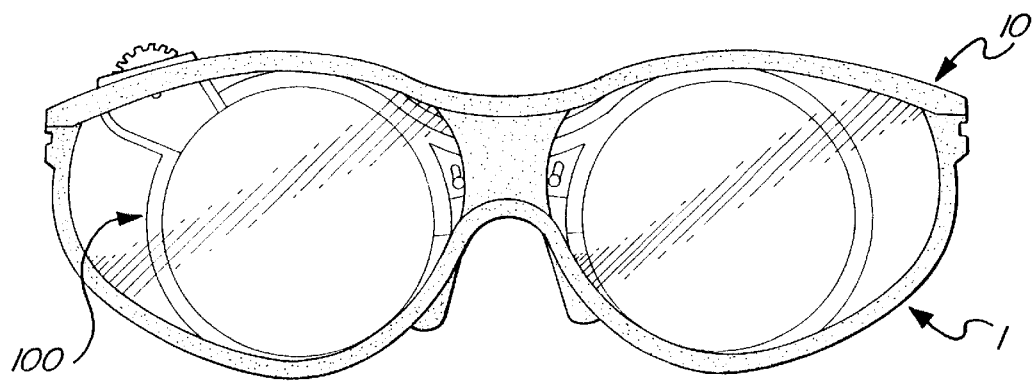
FIG. 1 is a frontal elevation of the lens assembly of the present invention.
Figure 2:
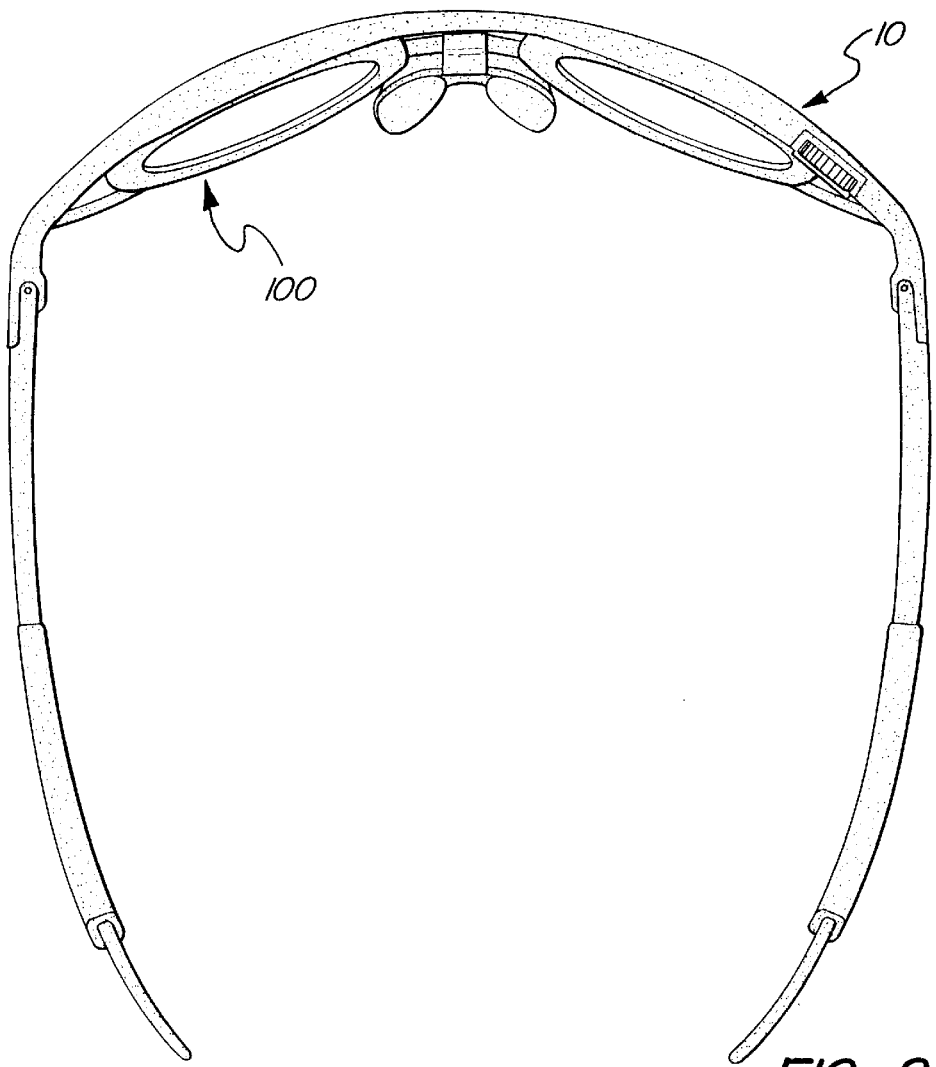
FIG. 2 is a top-down view of the lens assembly of the present invention.
Figure 3:
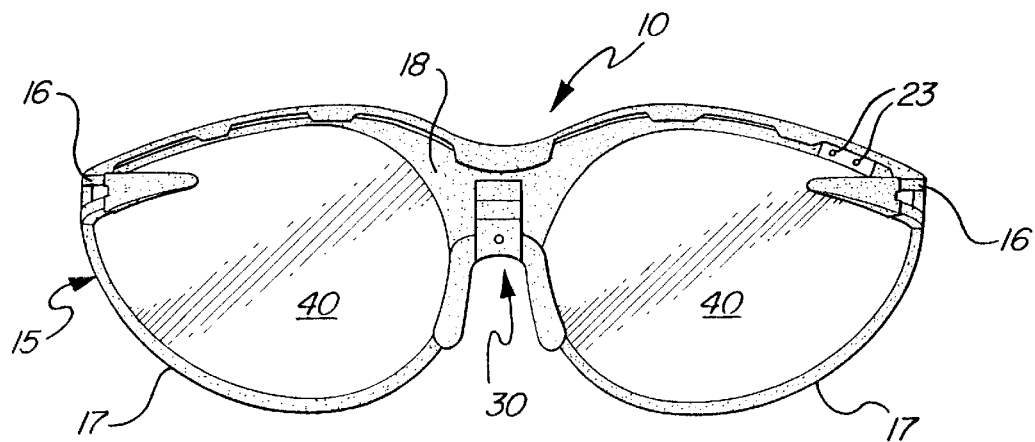
FIG. 3 is a rear view of the first eyewear element of the present invention.

Referring first to FIGS. 1 and 2, the lens assembly 1 of the present invention generally comprises first 10 and second 100 removably superimposed eyewear elements. Lens assembly 1 is intended to be worn by a single wearer, and first 10 and second 100 eyewear elements may comprise sunglasses, eyeglasses, or a combination thereof, depending upon wearer need or desire. More specifically, first eyewear element 10 preferably comprises a frame member 15 including earpieces 16, a pair of framing means 17 for receiving therein suitable lenses 40, and an intermediate portion, such as the illustrated bridge 18, disposed between and connecting framing means 17. (FIG. 3.) A nose piece 30, including in the illustrated form cooperative engagement means for removably retaining second eyewear element 100, is attached to bridge 18. In the most preferred form the present invention, nose piece 30 is eliminated and individual nose pads are attached directly to second eyewear element 100 proximate the bridge portion thereof, as is known in conventional eyeglasses and sunglasses frames. Such nose pieces may also be formed integral with second eyewear element 100, again per known methods. First eyewear element 10 may define any of a variety of aesthetically pleasing shapes and styles as desired. Of course, first eyewear element 10 need not include frame member 15, and may alternatively comprise a unitary lens having earpieces extending therefrom, such as is known to those of skill in the art. According to such an alternative embodiment, the intermediate portion comprises simply a medial area of the unitary lens proximate the wearer's nose.

Figure 4A:
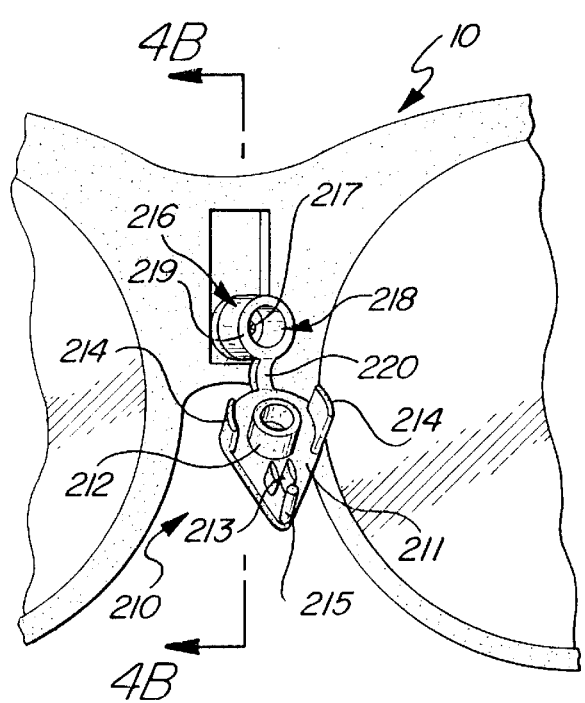
FIG. 4A is a perspective view of one embodiment of the cooperative engagement means of the present invention.
Figure 4B:
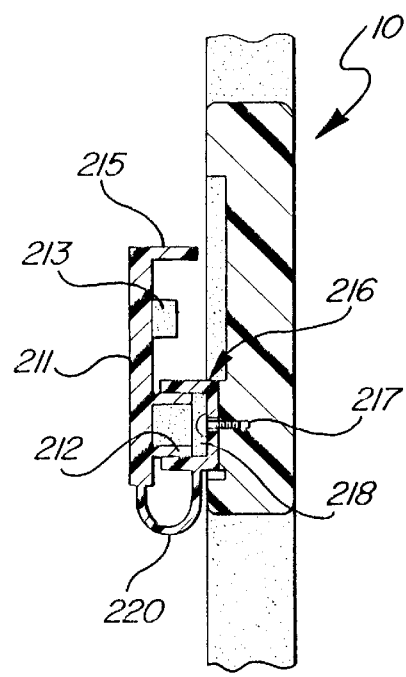
FIG. 4B is a cross-section of the embodiment of the cooperative engagement means of FIG. 4A.
Figure 4C:
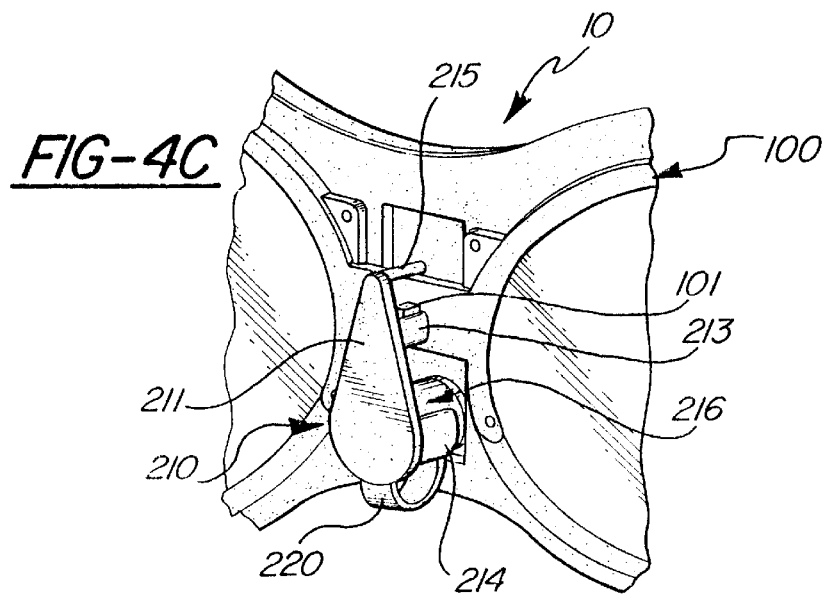
FIG. 4C is a perspective view of the cooperative engagement means of FIGS. 4A and 4B shown in operation.

Referring now to FIGS. 4A through 4C, the most preferred form of the cooperative engagement means of the present invention are shown to comprise closure 210, which generally includes closure plate 211 hingedly connected to stand-off 216 by means of hinge 220. For ease of manufacture, it is preferred that closure be of unitary construction; for example being fashioned of solid plastic or like polymer. Hinge 220 is preferably sufficiently strong to withstand repeated bending without breaking. As shown, stand-off 216 comprises a cylindrically-shaped element fixedly connected to the rear surface of bridge 18 of first frame member 15 by suitable fastening means, such as the illustrated screw 217. A blind bore 218 in stand-off 216 receives therein locking projection 212 provided on closure plate 211. Locking projection 212 is complimentary in shape to and dimensioned to be snugly received within blind bore 218 of stand-off 216. For reasons explained further herein below, the dimensions of locking projection 212 are such that, upon receipt within bore 218, locking projection 212 urges a slight radial outward deformation of wall 219 of stand-off 216. In the illustrated embodiment, locking projection 212, bore 218, and stand-off 216 are shown to define cylindrical shapes. However, those of skill in the art will appreciate that closure 210 need not be so limited, and the aforementioned elements may define any desired shape, subject to the limitations of operation and interrelation set forth herein. Closure plate 211 has further disposed thereon tabs 213, locking tabs 214, and a vertical stabilizing post 215. Tabs 213 are provided in spaced-apart, parallel relation so as to define therebetween a channel for securely receiving therein rib 101 provided upon second eyewear element 100. Tabs 213 project outward from closure plate 211 such that, in the closed configuration thereof, tabs 213 project inward towards the rear surface of bridge 18 of first frame member 15. Locking tabs 214 of the illustrated embodiment define spaced-apart arcuate ribs of curvatures similar to that of locking projection 212. Locking tabs 214 project upward from closure plate 211 in the same direction as locking projection 212 and tabs 213, each locking tab 214 being spaced radially apart from locking projection 52 a distance approximately equivalent to the radial dimensions of wall 219 of stand-off 216 so as to define a channel for receiving a portion of wall 219 therein in the closed configuration of closure 210. Stabilizing post 215 incorporated into the illustrated embodiment of closure 210 projects perpendicularly away from the surface of closure plate 211 and, in the closed configuration of closure 210, towards the rear surface of bridge 18. (FIG. 4C.) In the assembled condition of the present inventive lens assembly, post 215 extends over the top-most surface of the flexible intermediate portion of second eyewear element 100, as shown, to prevent unwanted vertical movement of second eyewear element 100 relative to first eyewear element 10. Accordingly, the longitudinal dimensions of stabilizing post 215 are preferably sufficient to prevent passage of the flexible intermediate portion of second eyewear element 100 between post 215 and the rear surface of bridge 18 of first frame member 15.

Still referring to FIGS. 4A through 4C, closure 210 of the preferred cooperative engagement means is shown in operation. In the open configuration of closure 210, locking projection 212 is removed from bore 218 such that closure plate 211 is non-parallel to the rear surface of bridge 18 of first frame member 15. In the closed configuration, locking projection 212 is snugly received within bore 218 such that closure plate 211 is brought into approximately parallel alignment with the rear surface of bridge 18. Upon engagement, the slightly larger radial dimensions of locking projection 212 urge wall 219 of stand-off 216 radially outward and into snug frictional engagement with locking tabs 214. As shown, tabs 213 are brought into engagement with and receive securely therebetween rib 101 provided on second eyewear element 100, thereby preventing unwanted lateral movement of second eyewear element 100. Stabilizing post 215 extends over the flexible intermediate portion of second eyewear element 100 and towards bridge 18 to prevent unwanted vertical separation of the first 10 and second 100 eyewear elements. By virtue of the longitudinal dimensions of stand-off 216, the closed configuration of closure plate 211 also urges second eyewear element 100 into abutment with the rear surface of bridge 18 of first frame member 15.

Figure 5A:
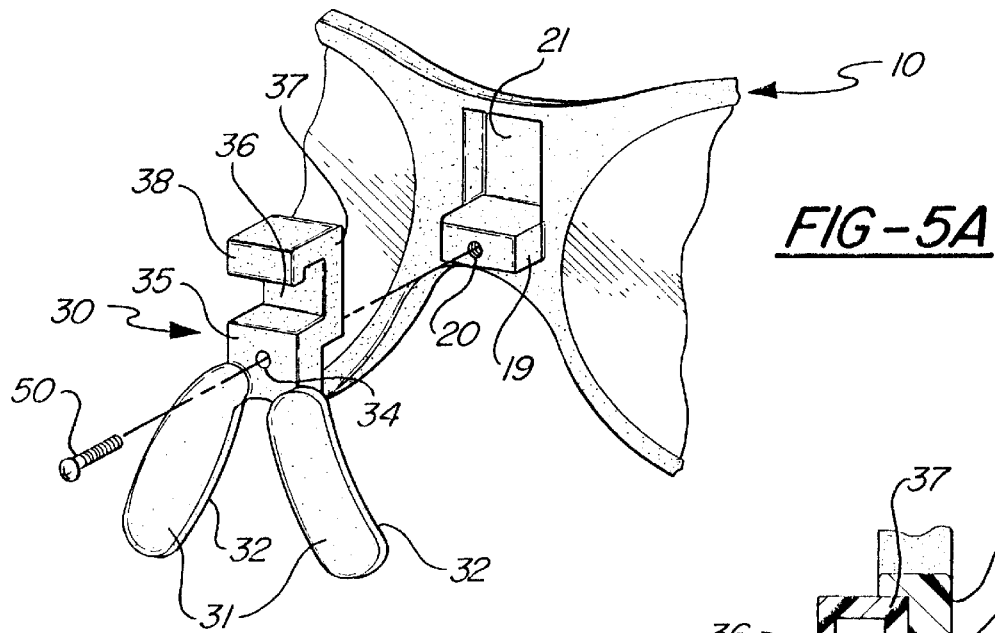
FIG. 5A is a perspective view of another embodiment of the cooperative engagement means of the present invention.
Figure 8A:
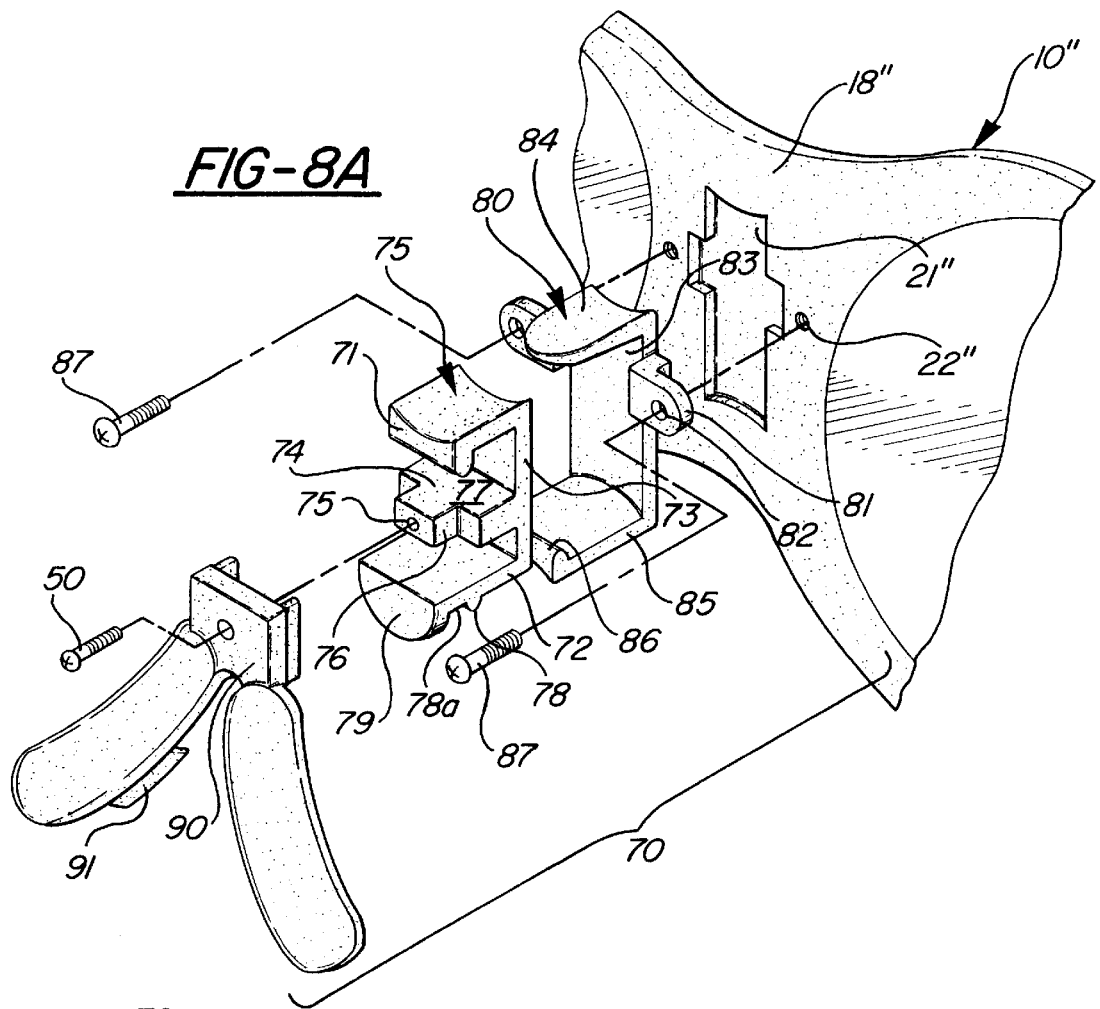
FIG. 8A is a perspective view of yet another embodiment of the cooperative engagement means of the present invention, shown in a disassembled.
Figure 8B:
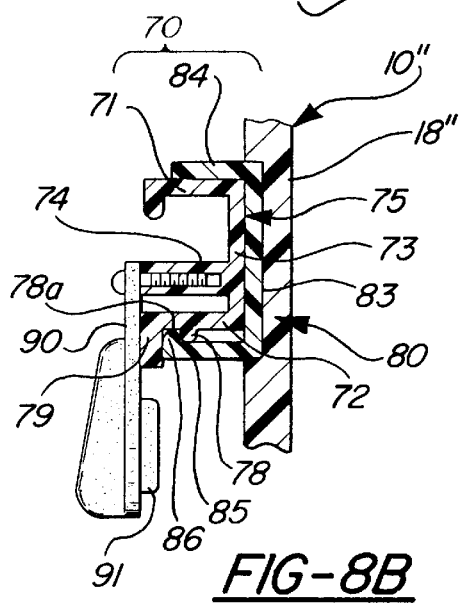
FIG. 8B is a cross-section of the cooperative engagement means of FIG. 8A, shown in an assembled condition.
Figure 8C:
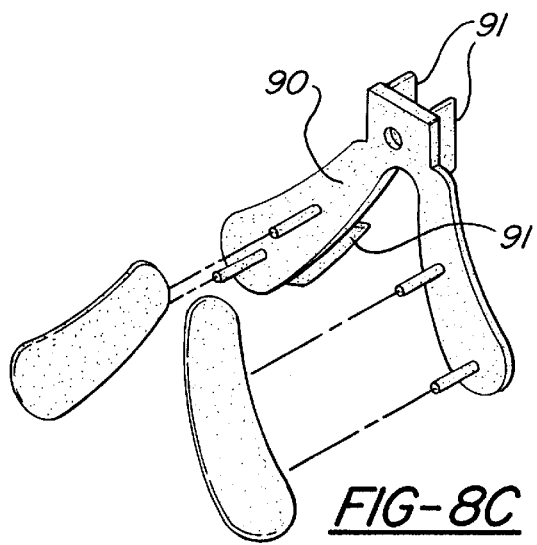
FIG. 8C is an exploded perspective view of the nose piece of FIGS. 8A and 8B.

Referring now to FIG. 5A, a second embodiment of the cooperative engagement means of the present invention is shown. According to this embodiment, nose piece 30 includes nose pads 31 depending from wing-like extensions 32 projecting downwardly and away from central portion 35. Nose pads 31 may be formed integral with nose piece 30 or may be formed separately and mounted to a separate nose pad member 90, such as depicted in FIG. 8C. Still referring to FIG. 5A, bore 34 extends through central portion 35 of nose piece 30 for receiving therethrough a screw 50 or the like. In the illustrated embodiment, nose piece 30 is formed integral with cooperative engagement means which permit first 10 and second 100 eyewear elements to be removably superimposed. As shown, the cooperative engagement means of this embodiment comprise a continuous, transversely oriented channel 36 defined by a flexible "C"-shaped clamp comprising central portion 35 and arm 37 extending initially upward therefrom and ultimately terminating in an incompletely downwardly extending flange 38. Channel 36 is similar in dimensions to the intermediate portion of second eyewear element 100 so that the same may be removably captured therein. To this end, at least arm 37 is preferably manufactured from a resilient polymer such that arm 37 may be repeatedly flexed away from its illustrated relaxed orientation to permit receipt of the intermediate portion of second eyewear element 100 within channel 36, as explained more fully hereinbelow.

Figure 5B:
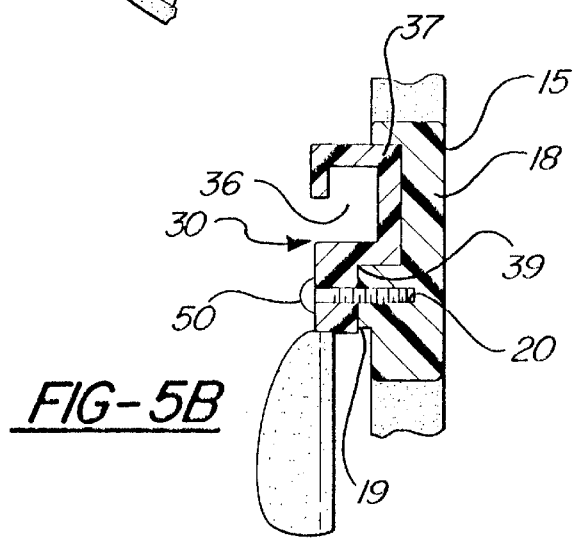
FIG. 5B is a cross-section of the embodiment of the cooperative engagement means of FIG. 5A.

Referring now also to FIG. 5B, nose piece 30 defines an irregular profile opposite channel 36, including a recessed notch 39 corresponding in dimensions to ledge 19 protruding outwardly from bridge 18 of first frame member 15. Ledge 19 includes a threaded bore 20 therein for threadingly receiving a screw 50, thereby permitting nose piece to be securely fastened to first frame member 15. A recess 21 formed in bridge 18 and complimentary in dimensions to arm 37 further prevents unwanted rotational movement of nose piece 30 relative to first frame member 15.

Figure 6A:
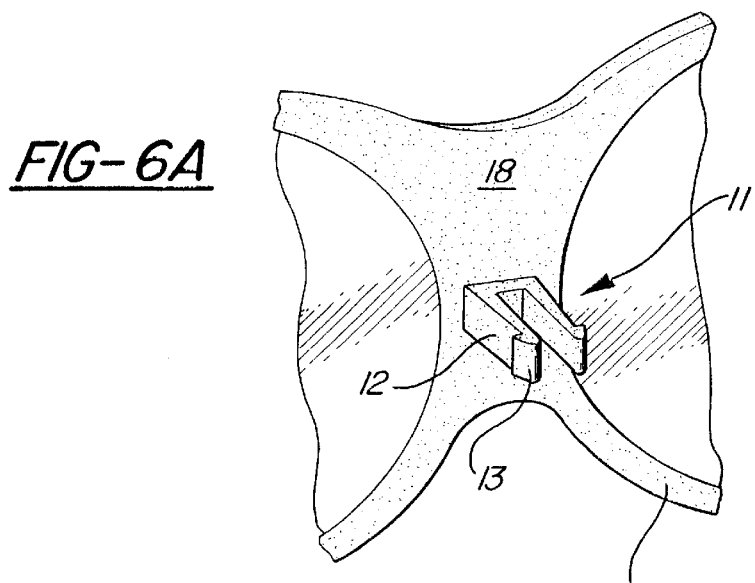
FIG. 6A depicts in perspective view of one embodiment of fastening means according to the present invention.
Figure 6B:
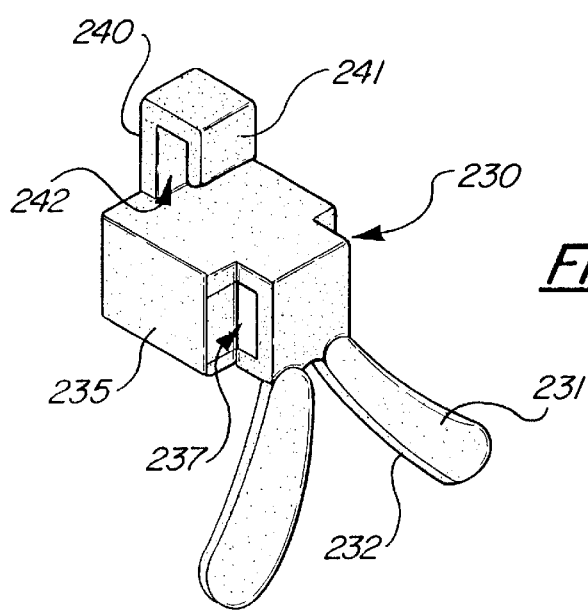
FIG. 6B is a perspective view of one embodiment of a nose piece of the present invention shown incorporating the cooperative engagement means of FIG. 5A.
Figure 6C:
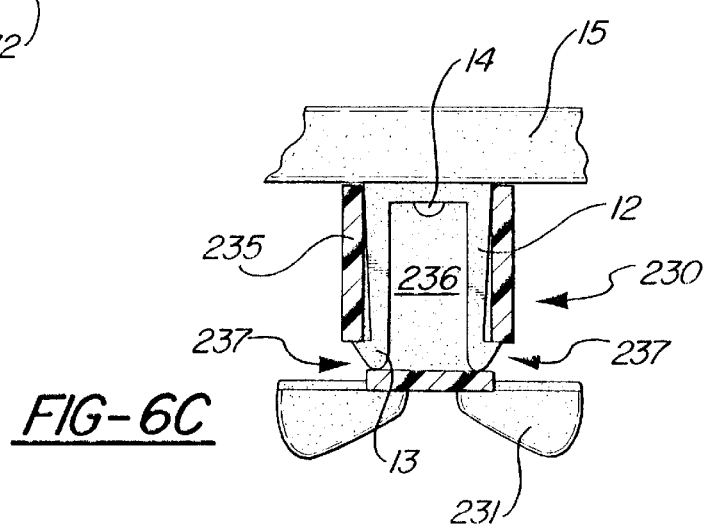
FIG. 6C is a cross-section of the fastening means of FIG. 6A and the nose piece of FIG. 6B in an assembled condition.

With reference being had to FIGS. 6A through 6C, the cooperative engagement means of FIG. 5A, comprising a continuous, transversely oriented channel defined by a flexible "C"-shaped clamp, is shown in conjunction with a nose piece 230 of similar composition and construction, the nose piece 230 further comprising fastening means by which the nose piece is removably connected to first frame member 15. In particular, nose piece 230 includes nose pads 231 depending from wing-like extensions 232 projecting downwardly and away from a central portion 235. As with earlier-described embodiments of the nose piece, nose pads 231 may be formed integral with nose piece 230 or may be formed separately and mounted to a separate nose pad member. (Not shown.) As described in greater detail above, the cooperative engagement means comprise a flexible, resilient arm 240 extending initially upward and terminating in an incompletely downwardly extending flange 241 to define a channel 242 similar in dimensions to the intermediate portion of second eyewear element 100. According to this embodiment of the nose piece, however, the fastening means comprise central portion 235 comprising a blind cavity 236 and a fastening member 11 provided on the rear surface of bridge 18 of first frame member 15 and receivable within cavity 236. As shown, fastening member 11 comprises first and second resilient tabs 12 projecting perpendicularly away therefrom. Each tab 12 includes on the distal-most end thereof a vertically-extending rib 13 or raised shoulder positively engageable within a corresponding opening 237 provided on opposing sides of central portion 235 at the end of cavity 236. Fastening member 11 may be formed integrally with first frame member 15, according to known methods, or may comprise a separate element fixed to first frame member 15 via screw 14 or like fastening means. In operation, tabs 12 of fastening element 11 are inserted within cavity 236, the dimensions of cavity 236 being smaller than the distance between the lateral-most edges of ribs 13 such that tabs 12 are biased inwardly towards each other until each of ribs 13 engages a corresponding opening 237, upon which tabs 12 return to their unbiased positions. In this fashion, each rib 13 is brought into confronting abutment with a lateral wall of central portion 235 and nose piece 230 is removably secured to first frame member 15 until the wearer forces ribs inward of cavity 237, thereby biasing tabs 12 inward and permitting withdrawal of fastening element 11 from cavity 237. (FIG. 6C.)

Figure 7A:
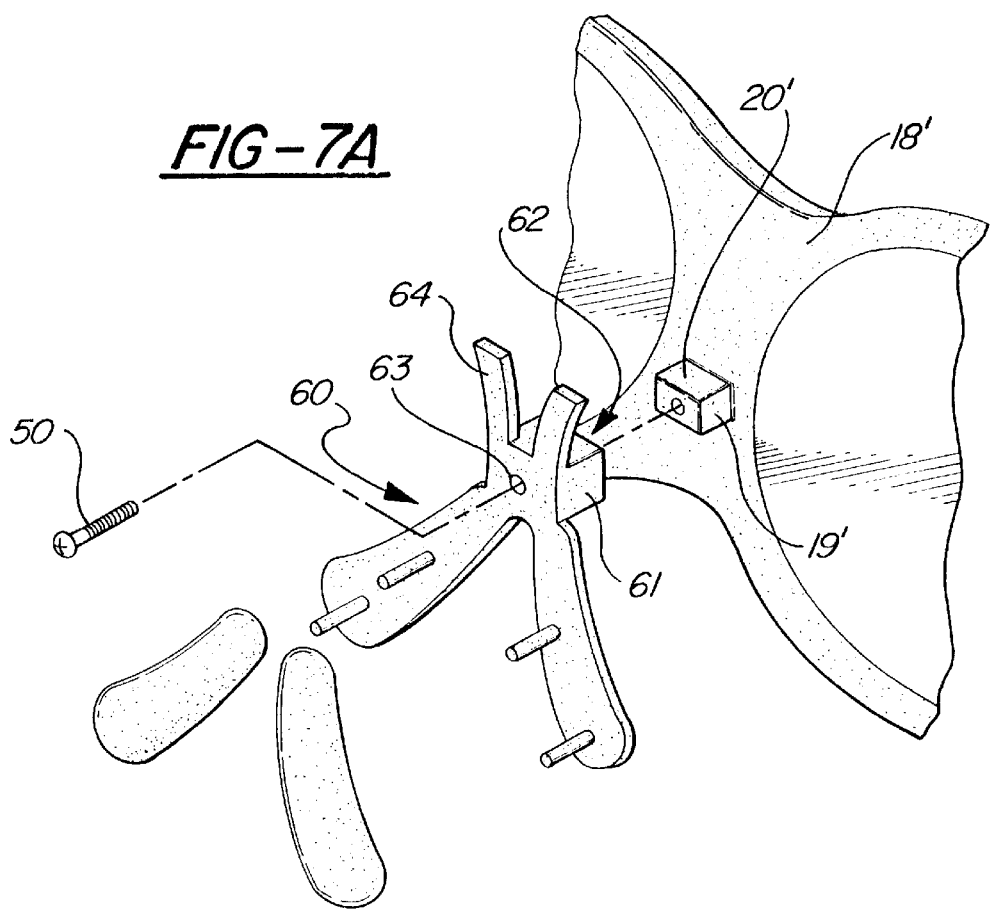
FIG. 7A depicts in perspective an alternate embodiment of the cooperative engagement means of the present invention, shown in a disassembled condition.
Figure 7B:
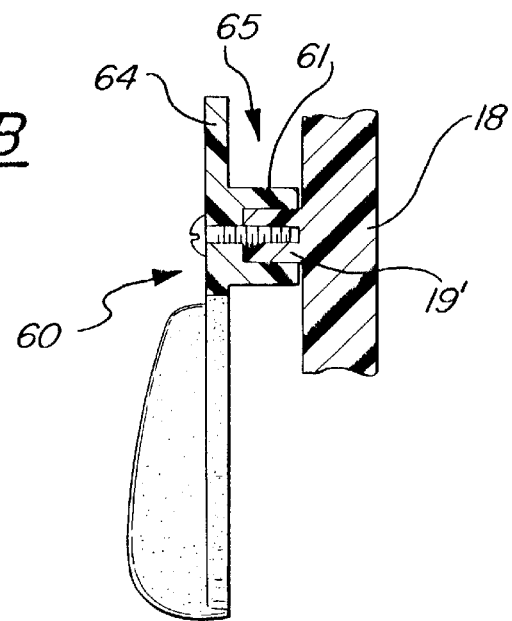
FIG. 7B is a cross-section of the cooperative engagement means of FIG. 7A shown in an assembled condition.

According to yet another alternate embodiment, a nose piece 60 is provided including a central portion 61 having a blind opening 62 therein corresponding in dimensions to and fitting securely over ledge 19' projecting from bridge 18'. (FIGS. 7A and 7B.) A passageway 63 extending through nose piece 60 coaxial with threaded bore 20' in ledge 19' facilitates secure engagement of nose piece 60 to ledge 19' via a screw 50 or the like. Nose piece 60 further includes, in the illustrated embodiment, integral cooperative engagement means including retaining means comprising first and second upwardly extending flanges 64 oriented parallel to the adjacent surface of bridge 18' so as to define, in cross-section, a generally "U"-shaped opening 65 between flanges 64 and bridge 18' for removably receiving therein the intermediate portion of second eyewear element 100, as explained further herein below. It will be appreciated that flanges 64 prevent axial removal of second eyewear element 100 (not shown) from opening 65.

In a further embodiment, a nose piece 70 is provided comprising fastening means by which nose piece 70 is removably connected to frame member 15 of first eyewear element 10". (FIGS. 8A and 8B.) The fastening means include removably interconnected first 75 and second 80 fastening elements. A separate nose pad member 90 is fixed to first fastening element 75 as shown. In the preferred form of this embodiment, nose pad member 90 includes one or more ribs 91 disposed thereon and projecting towards first eyewear element 10. These ribs abut both first frame member 15 and fastening element 75 in order to prevent unwanted rotational movement of nose piece 90. (FIG. 8C.) Referring again to FIGS. 8A and 8B, second fastening element 80 is dimensioned to fit within a correspondingly-shaped recess formed in the rear surface of bridge 18". A pair of opposing arms 81 including bores 82 there through are provided in coaxial alignment with threaded bores 22" formed in bridge 18" so that second fastening element 80 may be securely fixed thereto by screws 87 or the like. As depicted, second fastening element 80 includes vertically separated upper 84 and lower 8 portions extending perpendicularly away from either end of vertically oriented surface 83, so as to removably define an opening dimensioned to securely removably receive therein first fastening element 75. First fastening element 75 similarly includes a vertically oriented portion 73 from either end of which depend upper 71 and lower 72 portions. A third portion, comprising shelf 74, is disposed intermediate to and oriented parallel with both upper 71 and lower 72 portions. First fastening element 75 further includes cooperative engagement means, such as disclosed elsewhere herein, comprising a transversely oriented channel 77 defined between upper portion 71, shelf 74, and vertically-oriented portion 73. Channel 77 is preferably similar in dimensions to the intermediate portion of second eyewear element 100 so that the same may be removably captured in channel 77, as explained further herein below. As with the earlier-described cooperative embodiments of the cooperative engagement means, at least the flexible clamp of first fastening element 75 is preferably manufactured from a resilient polymer such that upper portion 71 may be repeatedly flexed away from its illustrated relaxed orientation to permit receipt of the intermediate portion of second eyewear element 100 within channel 77.

The outwardly facing surface of portion abuttingly contacts the adjacent opposing surface of second fastening element 80 when both first 75 and second 80 fastening elements are interrelated. To ensure secure interrelation, first 75 and second 80 fastening elements are further provided with selectively disengageable locking means comprising a rib 86 or other raised projection disposed on the upper surface of lower portion 85 of second fastening element 80 and engageable with a complimentary recess 78a formed on the lower surface of lower portion 72 of first fastening element 75 between rib 78 and tab 79. (FIG. 8B.)

Turning next to FIGS. 9 through 11, second eyewear element 100 preferably comprises a frame member 105 including a pair of framing means 106 for receiving therein lenses 160. Framing means 106 are connected in spaced-apart fashion by a flexible intermediate portion which, in the illustrated embodiment, includes a first bridge 107 formed integral with frame member 105. A separate second bridge 130 is also provided overlapping both first bridge 107 as well as portions of framing means 106 adjacent the brow portion of frame member 105. As shown, corresponding axially-aligned flanges 108, 109 and 131, 132 disposed, respectively, on each of frame member 105 and second bridge 130 receive screws 170 or other like means there through to fixedly join second bridge 130 to frame member 105. Second frame member 105 is preferably manufactured from a substantially rigid polymer, according to known methods, such that it cannot be easily broken. As such, the flexibility of first bridge 107 in the illustrated embodiment is achieved through its relatively thin lateral cross-section, which facilitates longitudinal bending along a transverse medial axis T as shown. In contrast, the preferred planar dimensions of first bridge 107 prohibit excessive and unwanted torsional flexing thereof. Second bridge 130 is preferably manufactured from a relatively more flexibly resilient polymer than frame member 105, so as to limit unwanted excessive reinforcement of first bridge 107 against longitudinal bending. Of course, it is also envisioned that first bridge 107 may be manufactured from a more flexible polymer than the remainder of second frame member 105, according to methods known to those skilled in the art.

Still referring to FIGS. 9 through 11, framing means 106 further include means for radially adjusting the internal dimensions thereof to accommodate lenses 160 of varying diameters. To this end, framing means 106 are preferably of the split-ring type, with free end 110 of each framing means 106 terminating in a first flange 111. Each first flange 111 includes a threaded bore 112 oriented approximately parallel with the transverse axis of lenses 160. Extending downwardly from opposite ends of second bridge 130 and formed integral therewith are spaced-apart second flanges 133. Second flanges each include, as illustrated, slots 134 in axial alignment with bore 112 and extending generally parallel with the arc of each framing means 106. In assembly of framing means 106, first 111 and second 133 flanges slidingly abut in an overlapping relationship with bore 112 being positionable at any point along the length of slot 134 and the first 111 and second 133 flanges adjustably fixed in place relative to each other via a screw 171 or the like. In this fashion, the internal dimensions of each framing means 106 may be selectively increased or decreased to a degree limited only by the length of each slot 134, which may of course be of any desired length. According to an alternate embodiment of the means for adjusting the internal dimensions of framing means (not shown), first 111 and second 133 flanges are eliminated. Instead, each free end 110 of framing means 106 include an integral polymeric pin projecting perpendicularly therefrom in a direction approximately parallel with the transverse axis of lenses 160. Each slot 134, as described above, is likewise transposed to the downwardly extending portion of bridge 130 opposing each free end 110. Each polymeric pin is engageable within a corresponding slot 134 as free ends 110 are slidingly abutted with respective downwardly extending portions of bridge 130 in overlapping relation. Radial adjustment of the diameter of each framing means 106 is effected by positioning pins within respective slots 134. When the desired diameter of each framing means 106 is achieved, the same may be fixed by sonic welding of each polymeric pin within its respective slot 134, according to known techniques.

In the preferred form of the present invention the lens assembly comprising first 10 and second 100 eyewear elements comprises variable-density sunglasses. Accordingly, each of lenses 40 and 160 are polarized, with lenses 160 capable of selective axial rotation so as to affect the degree of light transmission through the lens assembly. Each lens 160 is freely axially rotatably disposed within an internal circumferential channel 113 defined in framing means 106. (FIG. 12.) Rotation of lenses 160 is effected through drive means including external actuation means in the form of a drive gear 120, a driven gear 125 in mechanical communication with drive gear 120, and flexible, unitary belt means 140 extending between and fixedly connected at opposite ends thereof to lenses 160 to effect simultaneous rotation of lenses 160. Belt means 140 includes at opposite ends thereof hooks (not shown), each hook engageable with a bore provided in each of lenses 160, such that lenses 160 may be securely interconnected for simultaneous rotation by belt means 10. As depicted, channel 113 is incomplete across the brow and first bridge 107 portions of frame member 105. (FIG. 9.) In the disassembled second eyewear element 100, accordingly, belt means 140 extend exposed across a portion of each of lenses 160 and the face of first bridge 107. Second bridge 130 therefore preferably includes a recessed groove 135 therein defining a continuous sealed passageway between channels 113 in each framing means 106 such that belt means 140 remain unexposed from without frame member 105. (FIG. 9A.)

Referring now to FIGS. 12 through 14, driven gear 125 is preferably formed integral with the appropriate lens 160 and comprises a plurality of teeth engageable with drive gear 120 to effect rectilinear movement of belt means 140 and, accordingly, rotation of lenses 160. Alternatively, driven gear 125 may be formed integral with belt means 140. Belt means is ideally formed from a suitable polymer such as polypropylene or the like, permitting the same to be molded according to known techniques with driven gear 125 formed integrally therewith according to one embodiment of the present invention. Driven gear may alternatively comprise other means mechanically communicating with drive gear 120 to effect rotation of at least one of lenses 160. Second frame member 105 includes a gear housing 114 disposed proximate either framing means 106 and comprising first 115a and second 115b detachably connectable halves. (FIGS. 12 through 14.)

Alternatively, however, it is also envisioned that gear housing 114 be disposed proximate first bridge 107 and correspondingly, that driven gear 125 be integrally formed centrally in belt means 140. (Not shown.) Still referring to FIGS. 12 and 14, a cylindrical axle projects perpendicularly forward from the first half 115a of gear housing 114 upon which axle 116 drive gear 120 is freely rotatably mounted. Axle 116 includes a blind threaded bore therein for threadingly receiving a screw 200 or the like, such that first 115a and second 115b halves of gear housing 114 may be fixedly connected with drive gear 120 sandwiched therebetween. As depicted, drive gear 120 is preferably at least partially exposed without the assembled gear housing 114 so as to be manually accessible by the wearer. To provide for the selective positioning of lenses 160 between rotational positions corresponding to a maximum and a minimum amount of light transmission through lenses 40 and 160, a first gear stopper 121 is provided on drive gear 120. Gear stopper 121 projects axially away from drive gear 120 in a first direction so as to selectively occupy one of opposing arcuate slots 118a or 118b provided through first half 115a of gear housing 114. As shown, each slot 119a, 119b defines a portion of the rotational path of gear stopper 121 during movement of drive gear 120. Each slot 118a, 118b terminates in a stop surface 119a, 199b, respectively, each stop surface arresting movement of gear stopper 121 therebeyond as drive gear 120 is rotated in either the clockwise or counterclockwise direction. As indicated, the position of each stop surface 119a, 119b corresponds to those orientations of lenses 160 affecting both a maximum and a minimum of light transmission through the lens assembly. In this fashion, a wearer may more simply modify light transmission according to his or her individual preference.

Referring now to FIGS. 3 and 12, second half 115b of gear housing 114 is further provided with stabilizing means which in one embodiment of the present invention comprise one or more pins 122 projecting perpendicularly away from second half 115a and towards the adjacent rear face of first eyewear element 10. (Not shown.) Each pin 122 is received within a correspondingly shaped, coaxially aligned socket 25 provided in first frame member 15, thereby preventing unwanted rotational movement of the assembled first 10 and second 100 eyewear elements with respect to each other, particularly during manual operation of the above-disclosed drive means.

In an alternate embodiment, shown in FIGS. 15 and 15A, the stabilizing means comprise a transversely extending flange 123 depending perpendicularly away from the upper edge of second half 115b of gear housing 114, projecting towards the front of second lens element 100. In the assembled lens assembly of the present invention, flange 123 is freely received within a correspondingly shaped recess formed in the upper surface of first frame member 15. As shown, flange 123 abuttingly engages first frame member 15 to prevent radial movement of second eyewear element 100 relative to first eyewear element 10.

Figure 16:
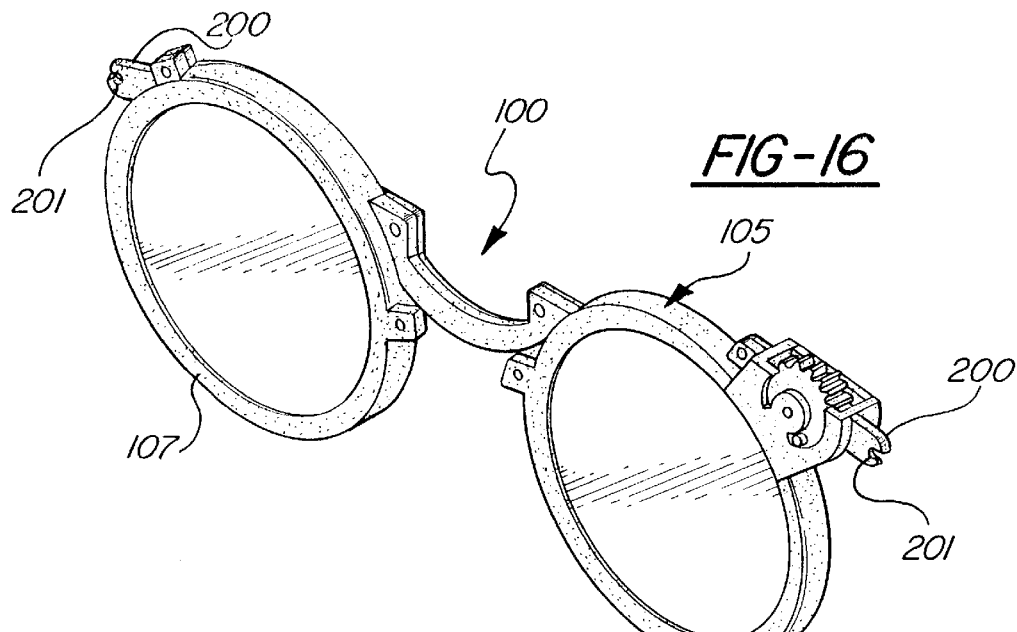
FIGS. 16 through 18 depict a further embodiment of the stabilizing means of the present invention.
Figure 17:
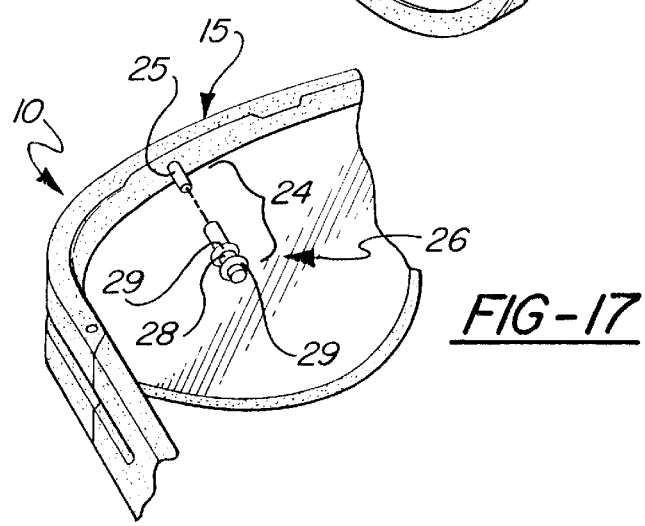
Figure 18:
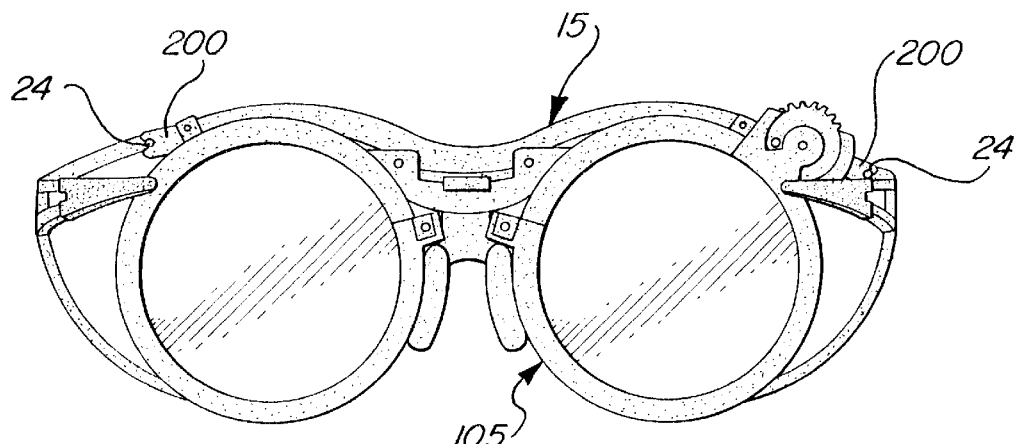

Referring next to FIGS. 16 through 18, further stabilizing means are disclosed comprising at least one flange 200 disposed on frame member 105 of the second eyewear element 100 and having an outwardly opening slot 201 therein for radially engaging, in the assembled condition of the present inventive lens assembly 1, a correspondingly-shaped post 24 projecting from frame member 15 of the first eyewear element 10. Two such flanges 200 may be provided, each disposed on opposite framing means 107 of frame member 105 as shown. (FIG. 18.) Likewise, two correspondingly positioned posts 24 are disposed on either framing means 17 of frame member 15. As shown, each post 24 ideally includes a circumferential groove 28 proximate the free end of post 24, groove 28 dimensioned to securely fit within slot 201 on an adjacent flange 200. In the illustrated embodiment, groove 28 is defined by spaced-apart circumferential shoulders 29 of sufficient radial dimensions to prevent other than radial movement of flange 200 with respect to post 24. And while post 24 as shown incorporates first and second elements comprising a pin 25 integral with first frame member 105 and a sleeve 26 fixedly engageable thereover, it will be understood that the above-described stabilizing means may comprise a unitary post having the described elements formed integrally therewith according to means known to those of skill in the art.

Figure 19:
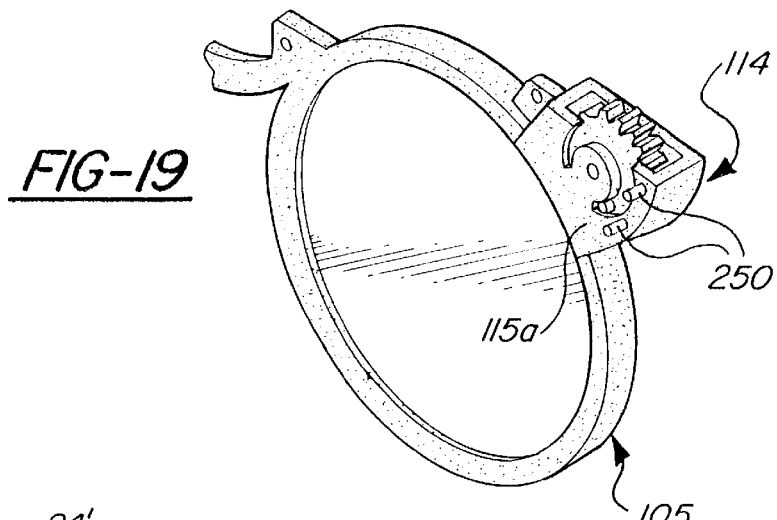
FIGS. 19 through 21 depict yet another embodiment of the stabilizing means of the present invention.
Figure 20:
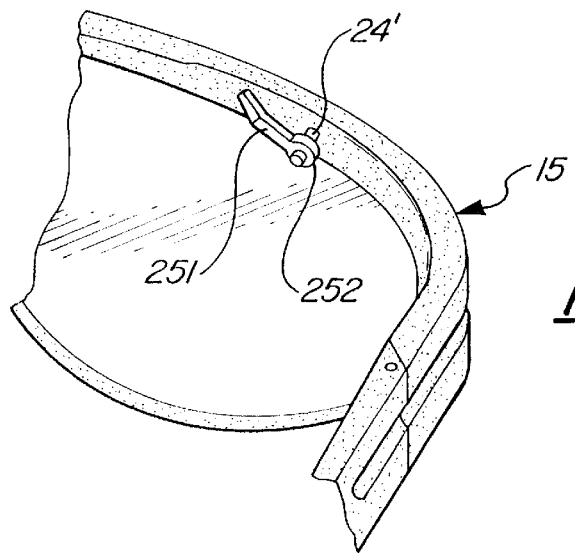
Figure 21:
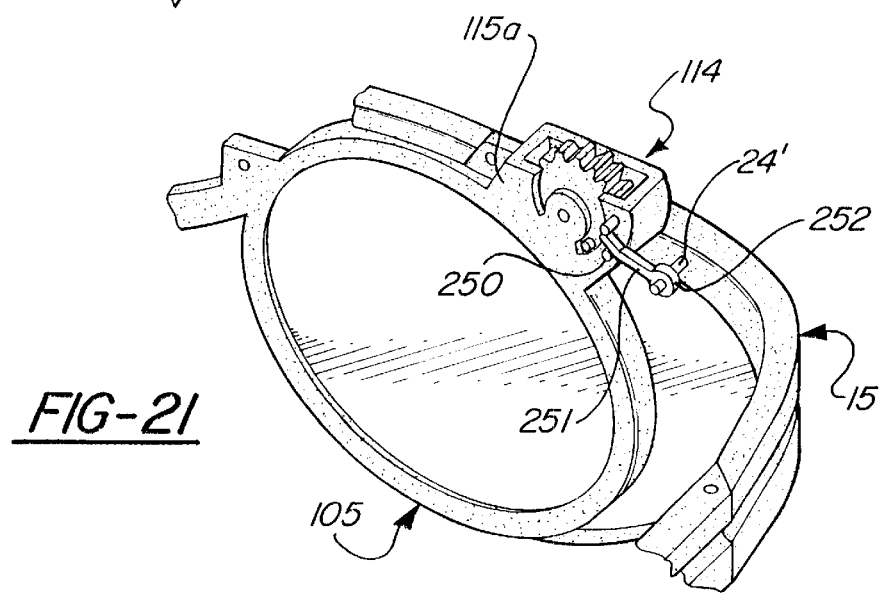

Referring to FIGS. 19 through 21, the most preferred stabilizing means for stabilizing first 15 and second 105 frame members relative to each other include pins 250 projecting perpendicularly away from the surface of first half 115a of gear housing 114, and a rectilinear stabilizing arm 251 projecting radially away from post 24' fixedly disposed on frame member 15. Pins 250 are oriented parallel to each other and define therebetween a channel for receiving a portion of stabilizing arm 251. Pins 250 may fabricated integrally with first half 115a of gear housing 114, or may be formed separately and affixed thereto, both according to means known to those skilled in the art. Stabilizing arm 251 is ideally formed from a rigid plastic, and is dimensioned to be securely received and immovably restrained between pins 250 upon assembly of first 10 and second 100 eyewear elements. In the illustrated embodiment, stabilizing arm 251 includes a ring 252 formed integrally at one end thereof, ring 252 having a bore dimensioned to receive post 24' therethrough. Post 24' is preferably formed integrally with first frame member 15. Stabilizing arm 211 is characterized by a slight bend therein, as shown, such that a significant portion of arm 251 is oriented approximately parallel to the surface of first half 115a of gear housing 114 in the assembled lens assembly. Arm 251 may alternatively be formed integrally with post 24' according to means known to those of skill in the art. In the preferred embodiment of the present invention, the foregoing stabilizing means are the only rotational stabilizing means incorporated in the inventive lens assembly.

Figure 22:
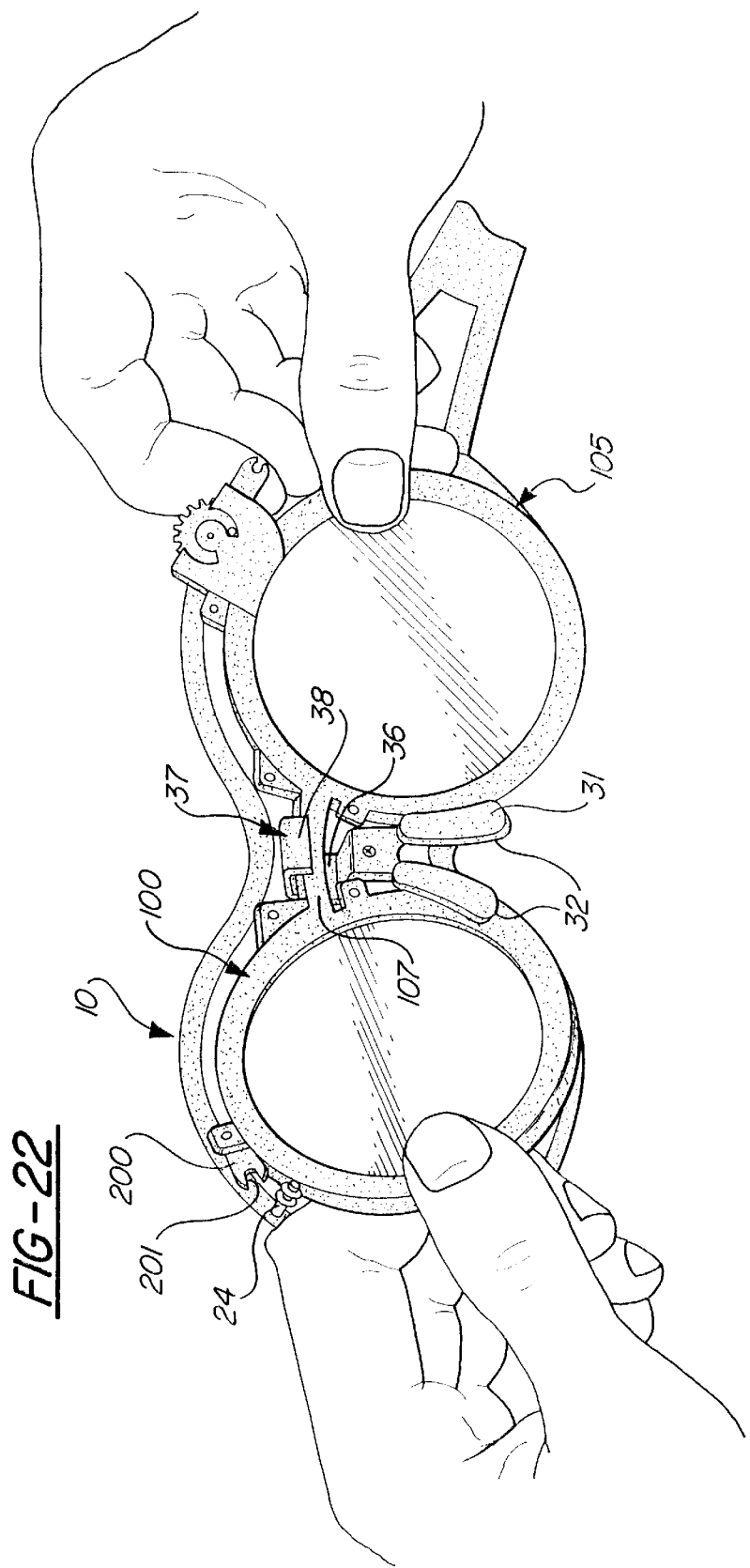
FIG. 22 is a perspective view of the first and second eyewear elements, incorporating the cooperative engagement means of FIGS. 5A and 5B, shown during assembly.

Referring now to FIG. 22, assembly of the first 10 and second 100 eyewear elements generally will be better understood. As shown, second frame member 105 is grasped by the wearer and longitudinally flexed along the flexible intermediate portion of bridge 107. Simultaneously, second frame member 105 is inserted within channel 36 of the illustrated cooperative engagement means by flexing arm 37 away from channel 36. Once second frame member 105 is received within channel 36, arm 37 returns to its predisposed configuration such that the intermediate portion of second lens element 100 is securely retained in channel 36 by means of flange 38, which precludes axial withdrawal of second lens element 100 therefrom. Also depicted in the illustrated lens assembly of the present invention are stabilizing means of the type described in greater detail hereinabove with reference to FIGS. 17 through 19. From that disclosure, it will be appreciated that, as first 10 and second 100 eyewear elements are cooperatively engaged in an axially superimposed relationship, posts 24 are simultaneously engaged with slots 201 in each flange to prevent unwanted rotational movement of first 10 and second 100 eyewear elements relative to each other. And while the above-described assembly of first 10 and second 100 eyewear elements is illustrated with reference to the cooperative engagement means shown in FIG. 5, it will be understood that function of the cooperative engagement means depicted in FIGS. 8A and 8B is substantially similar. Likewise, it will be appreciated that the foregoing is intended to be illustrative generally of the cooperative engagement of first 10 and second 100 eyewear elements according to the present invention, any of the various embodiments of the cooperative engagement means and stabilizing means described in structure and operation more fully hereinabove may be freely substituted for corresponding elements incorporated in the example of FIG. 22.

Of course, it will be appreciated that the foregoing specification is merely illustrative of several embodiments of the present invention, and that numerous additions and modifications thereto, apparent to those of ordinary skill in the art, will be possible without departing from the spirit and broader aspects of the present invention as set forth in the appended claims.

The invention in which an exclusive property or privilege is claimed is defined as follows:

1. A lens assembly comprising at least first and second removably superimposed eyewear elements each comprising a frame member including framing means for at least one lens, each said frame member having a first longitudinal curvature in an unassembled condition of said lens assembly, and at least said at least second eyewear element further having a flexible intermediate portion providing for longitudinal flexibility of said at least second eyewear element along a transverse medial axis thereof such that said at least second eyewear element is deformable to define a second longitudinal curvature complimentary with said first longitudinal curvature of said at least first eyewear element when said at least first and second eyewear elements are removably axially superimposed in longitudinal alignment.

2. The lens assembly of claim 1, wherein said at least first and second eyewear elements further include cooperative engagement means whereby said at least first and second eyewear elements are removably axially superimposed.

3. The lens assembly of claim 2, wherein said cooperative engagement means include a flexible clamp provided on said at least first eyewear element, said flexible clamp removably capturing said flexible intermediate portion of said at least second eyewear element therein.

4. The lens assembly of claim 3, wherein said framing means of at least said at least second eyewear element is split to define a movably free end of said framing means including a first flange portion selectively positionable in overlapping fashion along a fixed second flange portion of said frame member, said first and second flange portions adjustably connectable via fastening means so as to provide for selective radial adjustment of the internal dimensions of said framing means.

5. The lens assembly of claim 4, wherein said fixed second flange portion includes a slot defining a plurality of diameters of said framing means, said first flange portion includes a bore for receiving said fastening means, and said fastening means are engageable with said first and second flange portions along an axis approximately perpendicular with respect to the longitudinal axis of said frame member of said second eyewear element.

6. The lens assembly of claim 3, wherein said at least one lens of said second eyewear element comprises an axially rotatable light-polarizing lens, and said second eyewear element further includes drive means for incrementally rotating said rotatable polarizing lens relative to said at least one lens of said at least first eyewear element so as to affect light transmission through said lens assembly, said drive means including an externally actuated rotatable drive gear, the rotational movement of said drive gear being limited by arresting means such that said rotatable polarizing lens is positionable between rotational orientations corresponding to a maximum and a minimum amount of light transmission through said lens assembly.

7. The lens assembly of claim 6, wherein said arresting means comprise a gear stopper provided on said drive gear, and first and second stop surfaces engageable with said gear stopper to limit the rotational path of said drive gear.

8. The lens assembly of claim 1, wherein said at least first and second eyewear elements further include stabilizing means for preventing rotational movement of said at least first and second removably superimposed eyewear elements relative to each other.

9. The lens assembly of claim 8, wherein said stabilizing means comprise complimentary pin and socket means provided in each of said at least first and second eyewear elements.

10. The lens assembly of claim 8, wherein said stabilizing means comprise at least one flange provided on either of said at least first and second eyewear elements, said flange abutting the other of said at least first and second eyewear elements.

11. In a lens assembly including at least one frame member having framing means for at least one lens, improved framing means for radially adjusting the internal dimensions of said framing means, comprising:

said at least one frame member including a fixed flange portion including a slot; and said framing means being split to define a movably free end of said framing means including a second flange portion selectively positionable in overlapping fashion with said first flange portion along the length of said slot to define a plurality of diameters of said framing means, said first and second flange portions being adjustably connectable via fastening means, said fastening means being engageable with said first and second flange portions along an axis approximately perpendicular with respect to the longitudinal axis of said at least one frame member.

12. A lens assembly comprising:

at least first and second removably superimposed eyewear elements each comprising a frame member including framing means for at least one lens, each said frame member having a first longitudinal; curvature in an unassembled condition of said lens assembly, and at least said at least second eyewear element further having a flexible intermediate portion providing for longitudinal flexibility of said at least second eyewear element along a transverse medial axis thereof such that said at least second eyewear element is deformable to define a second longitudinal curvature complimentary with said first longitudinal curvature of said at least first eyewear element when said at least first and second eyewear elements are removably axially superimposed in longitudinal alignment; and cooperative engagement means whereby said at least first and second eyewear elements are removably axially superimposed, said cooperative engagement means including a flexible clamp provided on said at least first eyewear element, said flexible clamp removably capturing said at least second eyewear element.

13. The lens assembly of claim 12, wherein each said frame member includes framing means for two lenses, said framing means interconnected by a bridge, and wherein further said frame member of said first eyewear element includes ear pieces.

14. The lens assembly of claim 13, wherein said two lenses of said at least second eyewear element comprise axially rotatable light-polarizing lenses, and said second eyewear element further includes drive means for incrementally rotating said rotatable polarizing lenses relative to said two lenses of said at least first eyewear element so as to affect light transmission through said lens assembly, said drive means including an externally actuated rotatable drive gear, the rotational movement of said drive gear being limited by arresting means such that said rotatable polarizing lenses are positionable between rotational orientations corresponding to a maximum and a minimum amount of light transmission through the lens assembly.

15. The lens assembly of claim 14, wherein said arresting means comprise a gear stopper provided on said drive gear, and first and second stop surfaces provided on said second eyewear element and engageable with said gear stopper to limit the rotational path of said drive gear.

16. The lens assembly of claim 15, wherein said drive means are provided laterally on said second eyewear element, and wherein further said at least first and second eyewear elements include stabilizing means provided laterally thereon for preventing rotational movement of said at least first and second removably superimposed eyewear elements relative to each other.

17. The lens assembly of claim 16, wherein said stabilizing means comprise complimentary pin and socket means provided in each of said at least first and second eyewear elements.

18. The lens assembly of claim 16, wherein said stabilizing means comprise at least one flange provided on either of said at least first and second eyewear elements, said flange abutting the other of said at least first and second eyewear elements.

19. A lens assembly comprising at least first and second removably superimposed eyewear elements, at least said second eyewear element further having a flexible intermediate portion providing for longitudinal flexibility of said second eyewear element along a transverse medial axis thereof such that said at least second eyewear element is removably axially superimposed in complimentary longitudinal alignment with said first eyewear element;

wherein said at least first and second eyewear elements each comprise a frame member including framing means for at least one lens; and wherein said framing means of said second eyewear element is split to define a movably free end including a first flange portion selectively positionable in overlapping fashion along a foxed flange portion of said frame member of said second eyewear element, said first and second flange portions adjustably connectable via fastening means so as to provide for selective radial adjustment of the internal dimensions of said framing means of said second eyewear element.

* * * * *

UNITED STATES PATENT AND TRADEMARK OFFICE
CERTIFICATE OF CORRECTION

PATENT NO : 5,841,506

DATED : November 24, 1998

INVENTOR(S): Karasawa et al.

It is certified that error appears in the above-identified patent and that said Letters Patent is hereby corrected as shown below:

Column 3, line 17, after "disassembled" add --condition--.

Column 4, line 2, after "element 100" insert --(not shown in Figure 3)--.

Column 4, line 57, replace "52" with --212--.

Column 6, line 26, delete "therefrom" and replace with --from bridge 18--.

Column 6, line 67, after "member" delete "15".

Column 7, line 18, replace "8" with --85--.

Column 7, line 20, delete "removably".

Column 7, line 34, delete "cooperative".

Column 8, line 57, after "40" insert --(not shown)--.

Column 8, line 64, replace "125" with --145--.

Column 9, line 15, replace "125" with --145--.

Column 9, line 20, replace "125" with --145--.

Column 9, line 20, after "140" insert --as shown--.

Column 9, line 23, replace "125" with --145.

Column 9, line 34, replace "125" with --145--.

Column 9, line 39, after "bore" insert --117--.

UNITED STATES PATENT AND TRADEMARK OFFICE
CERTIFICATE OF CORRECTION

PATENT NO. : 5,841,506
DATED : November 24, 1998
INVENTOR(S) : Karasawa et al.

It is certified that error appears in the above-indentified patent and that said Letters Patent is hereby corrected as shown below:

Column 13, line 8, after "longitudinal" delete ";".
Column 14, line 36, delete "foxed" and insert --fixed--.

Signed and Sealed this

Thirtieth Day of November, 1999

Attest:

Attesting Officer

Q. TODD DICKINSON

Acting Commissioner of Patents and Trademarks